United States Patent

[11] 3,612,583

[72] Inventor Norman J. Anderson
 Erie, Pa.
[21] Appl. No. 849,134
[22] Filed Aug. 11, 1969
[45] Patented Oct. 12, 1971
[73] Assignee Zurn Industries, Inc.
 Erie, Pa.
 Continuation-in-part of application Ser. No. 676,809, Oct. 20, 1967, now Patent No. 3,475,043.

[54] DETENT MECHANISM FOR DISCONNECT COUPLING
 3 Claims, 8 Drawing Figs.
[52] U.S. Cl. ................................................. 287/104, 64/9
[51] Int. Cl. ................................................. F16d 1/00
[50] Field of Search ........................................... 64/9, 23; 192/114, 48.91, 53.7; 287/53 SS, 104

[56] References Cited
UNITED STATES PATENTS
| | | | |
|---|---|---|---|
| 2,198,273 | 4/1940 | Reggio | 192/53.7 |
| 2,435,444 | 2/1948 | Johnsen | 287/Ball |
| 2,598,780 | 6/1952 | Garnier | 64/23 X |
| 3,231,057 | 1/1966 | Wolf | 192/67 |
| 3,261,182 | 7/1966 | Allen et al. | 64/9 |
| 3,371,559 | 3/1968 | Scholl | 192/114 X |
| 3,475,043 | 10/1969 | Anderson | 64/9 X |

Primary Examiner—David J. Williamowsky
Assistant Examiner—Andrew V. Kundrat
Attorney—Charles L. Lovercheck ABSTRACT: The invention disclosed is a coupling of the gear type which is constructed in such a manner that one of its hubs can be moved from a connected position where its teeth engage the teeth on a sleeve, to a position where its teeth are disengaged from the sleeve teeth. Particular shaped locking plungers which engage particularly shaped recesses in the sleeve are provided to hold the hub either in locked or unlocked position. The particular shape of the plungers and grooves resist movement of the sleeve.

Inventor
NORMAN J. ANDERSON
By Charles L. Lovenbuck
Attorney

*INVENTOR.*
NORMAN J. ANDERSON
BY
*Charles L. Lonenbach*

PATENTED OCT 12 1971 3,612,583

Inventor
NORMAN J. ANDERSON
By Charles L. Lovercheck Attorney

DETENT MECHANISM FOR DISCONNECT COUPLING

CROSS REFERENCE TO RELATED APPLICATIONS

This application is a Continuation-in-part of Pat. application, Ser. No. 676,809, filed Oct. 20, 1967, now Pat. No. 3,475,043.

STATEMENT OF INVENTION

This invention relates to couplings and, more particularly, to gear type couplings of the disconnect type.

OBJECTS OF THE INVENTION

It is an object of the invention to provide an improved gear type disconnect coupling.

Another object is to provide a coupling that is simple in construction, economical to manufacture, and simple and efficient to use.

Another object is to provide a gear type disconnect coupling wherein an improved locking arrangement is provided.

DETAILED DESCRIPTION OF THE DRAWINGS

Figure 1:
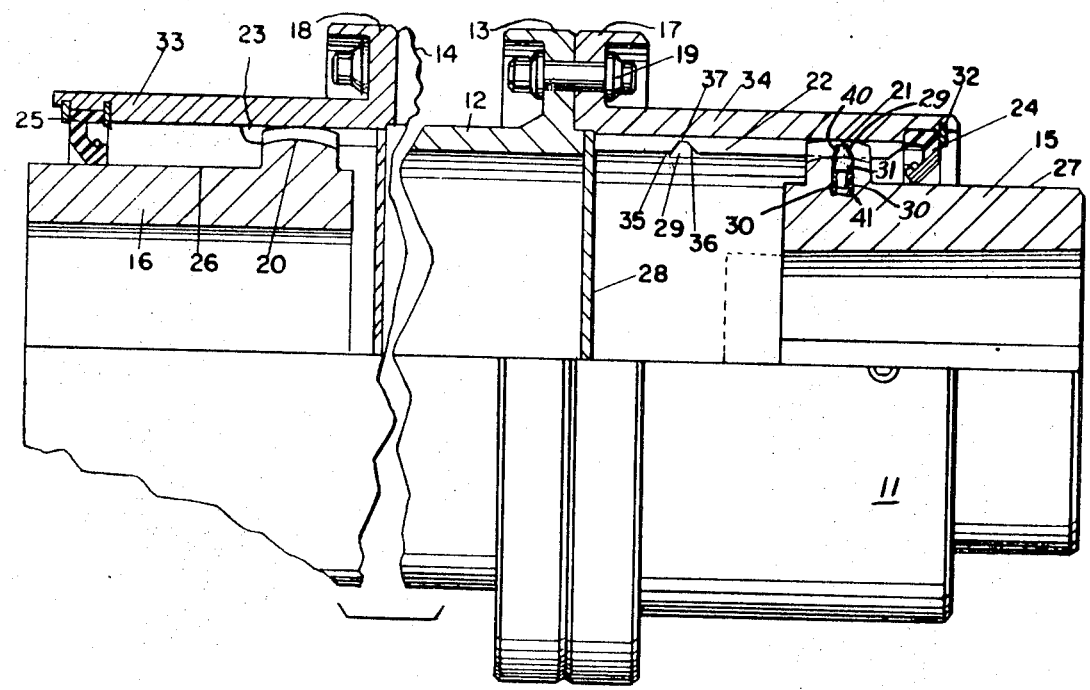
FIG. 1 is a longitudinal view partly in cross section of the coupling according to the invention.

Now with more particular reference to the drawings, the coupling shown is made up of two spaced hubs 15 and 16 which have external teeth 21 and 20 respectively. These external teeth 20 and 21 engage sleeve teeth 23 and 22 respectively. The sleeve teeth 22 and 23 are fixed to the internal peripheral surface of sleeves 33 and 34.

Each of the hubs 15 and 16 have suitable hollow bores for receiving a drive shaft to which they may be keyed by a suitable key way 40'.

At spaced intervals around the hub 15, there are formed holes or bores 30. These holes receive a compression spring 41 and the compression spring 41 receives the reduced size end 38 on plungers 31. Plungers 31 have the tapered surface 40 which rests against the inclined surfaces 35 and 36 of the notches 29 and 42 when the coupling is in the disconnected position. Each of the plungers 31 rests in one of the notches 42 when the coupling is in the connected position. The detents are generally cylindrical in shape with frustoconical ends and the notches are generally complimentary in shape to the frustoconical ends. The detents have a flat surface 47, the purpose of which is to provide an air relief from below the pin.

It will be noted that the sleeves teeth 23 do not extend the full length of the sleeve 33 so that when the sleeve is moved to the right, the teeth 20 will move out of engagement with the teeth 23 and in this position the plunger 31 will rest in the notches 29. When the teeth 20 engage the sleeve teeth 23, the hub teeth 21 will be in the position shown in FIG. 1 and 2.

The sleeves 33 and 34 are held in fixed relation to each other by the spacers 12, which have the flanges 13 and 14 bolted to flanges 17 and 18 on their respective sleeves by bolts 19. Sealing washers 24 and 25 in the form of rings are shown inserted in grooves at each end of each sleeve and held in place by snap rings 32 disposed in suitable grooves. The outer periphery of hubs 26 and 27 are cylindrical and make a smooth rubbing surface with the sealing washers 24 and 25.

A plate 28 is clamped between the ends of the sleeve teeth 22 and the end of spacer 12. The plate 28 provides a closure for the space between the sleeve and the hubs so that suitable shifting arrangement can be provided by wax of a shifting fork, hydraulic cylinder or the like, which is familiar to those skilled in the art, and which can be made to engage the flanges 13 and 17 to move the sleeve from the position where the teeth 20 are in engagement with sleeve teeth 23 as shown to a position where the teeth 20 are disengaged from the sleeve teeth 23. It will be noted that the sleeve teeth 23 extend only halfway along the sleeve so that there are no teeth in engagement with the hub teeth 20 when the coupling is in the disconnected position.

Figure 2:
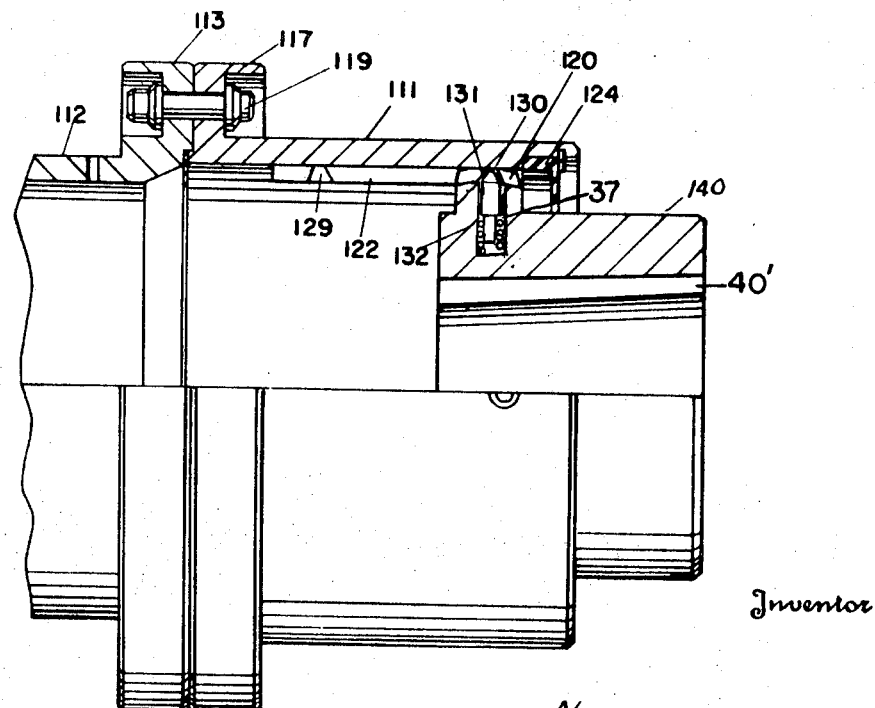
FIG. 2 shows the coupling of FIG. 1 in greater detail.
Figure 6:
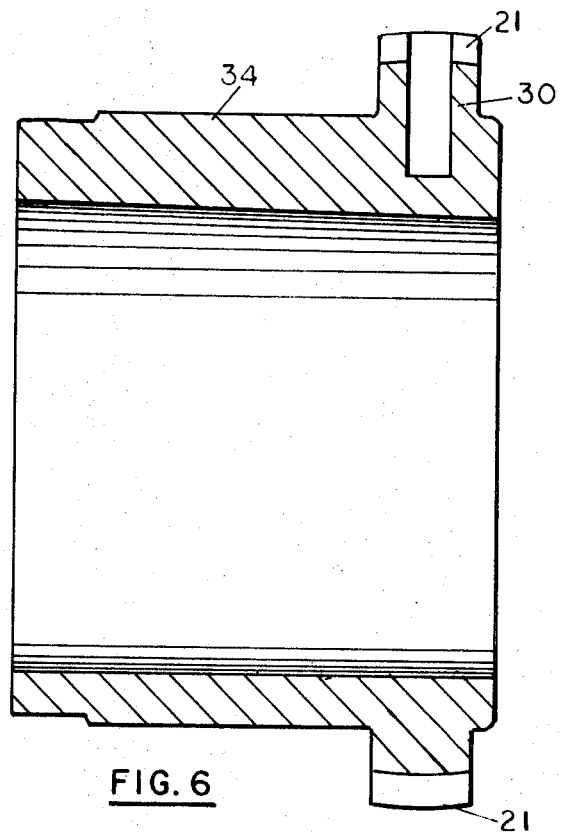
FIG. 6 is a longitudinal cross-sectional view of the hub.
Figure 8:
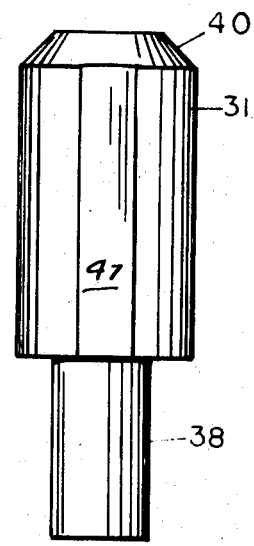
FIG. 8 is a view of the locking plunger taken in an axial direction of the coupling.
Figure 3:
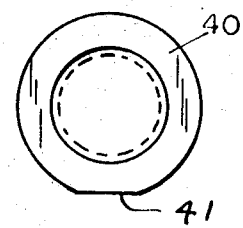
FIG. 3 is a bottom view of the locking plunger shown in FIG. 8.
Figure 7:
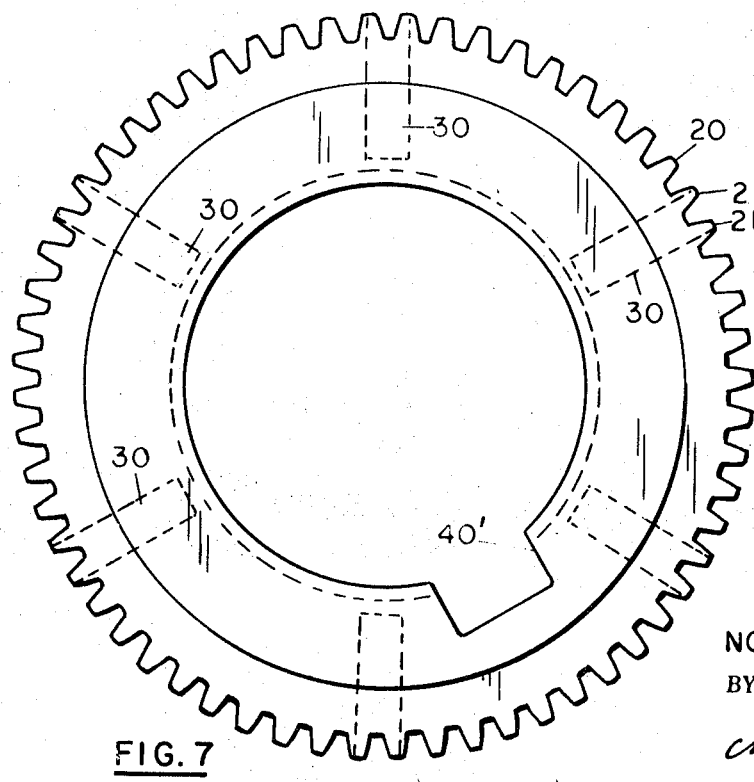
FIG. 7 is an end view of the hub.
Figure 5:
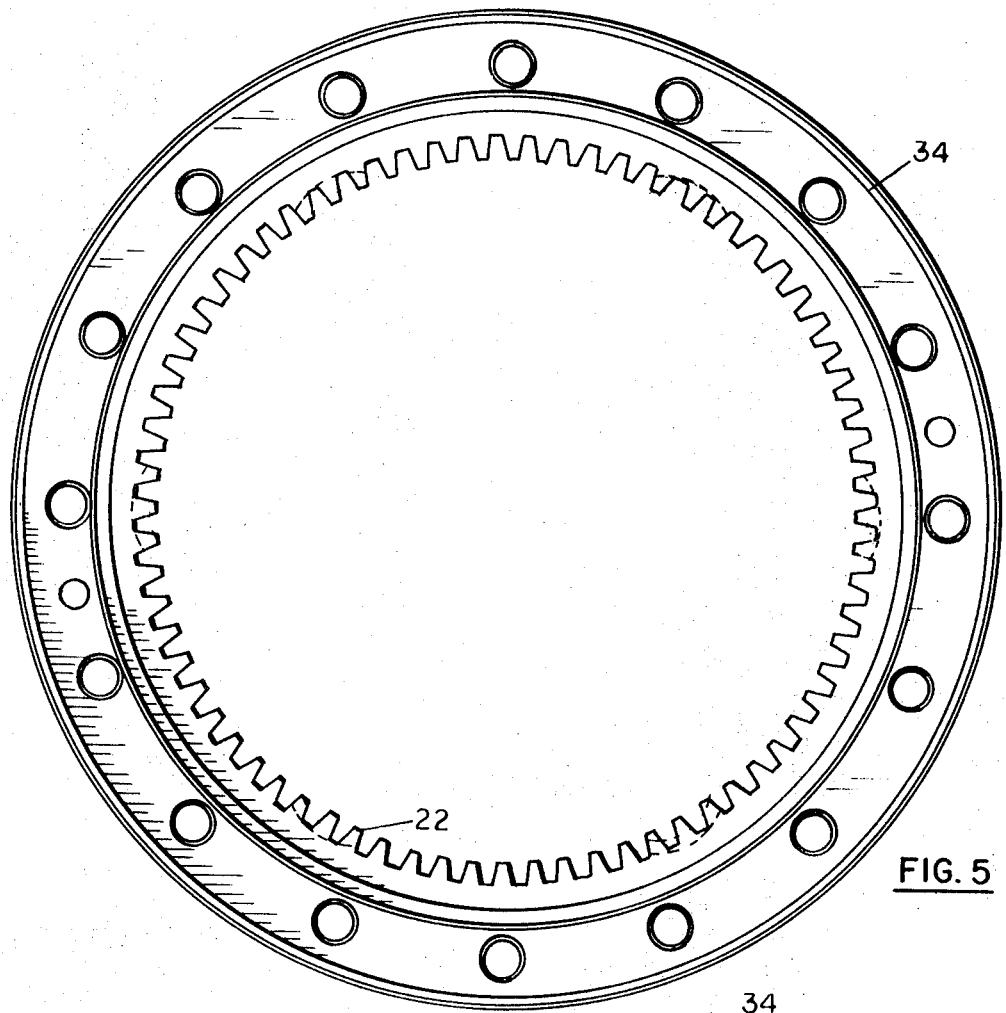
FIG. 5 is an end view of the sleeve shown in FIG. 4.
Figure 4:
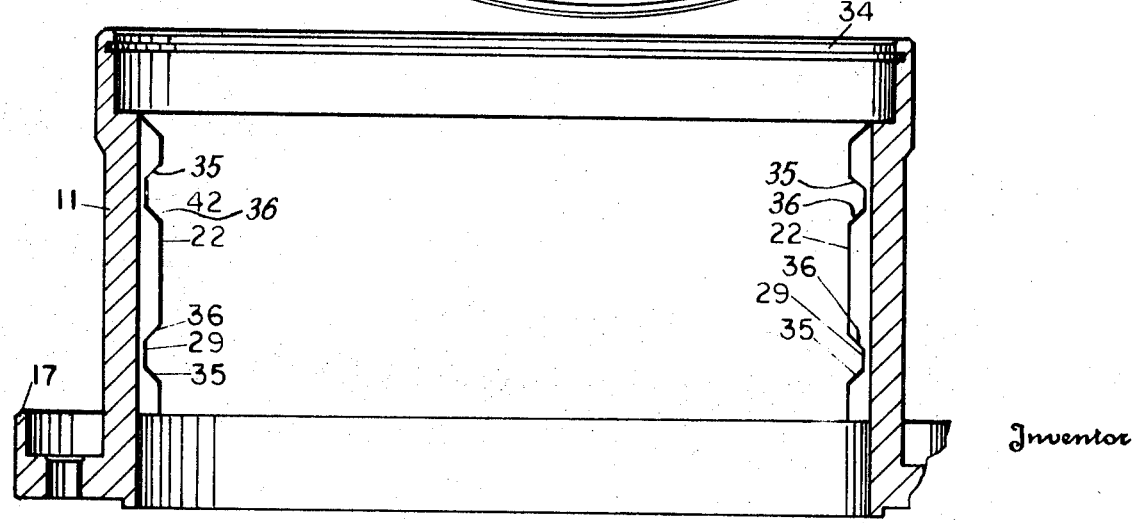
FIG. 4 is an enlarged cross-sectional view of the coupling sleeve.

In the embodiment of the invention shown in FIG. 2, a partial cross-sectional broken-away view of a coupling is shown. The coupling is made up of a sleeve 111, which is attached to spacer 112 by means of bolts 119 which pass through flanges 113 and 117. The sleeve 111 has internal teeth 122 which have spaced notches 129 and 130. The hub 140 has external teeth 120 which slidably engage the internal teeth 122. Lubricant is retained in the coupling by the seal 124. The hub has spaced bores which receive the helical spring 37 and the detent pin 131 has a reduced size end which is received in the helical spring 37. The hub 140 may slide in the sleeve 111 so that the detent 131 moves from the mouth 130 to the notch 129.

It will be noted that the detents shown in FIG. 2 are similar to those shown in FIG. 1. It has been discovered that the frustoconical end on a detent exerts a much more positive force on the sleeve than the ball-type detent and applicant was able to solve some serious design problems in the use of his couplings by using the detents disclosed herein instead of ball shaped detents which were originally used in applicant's product line.

The foregoing specification sets forth the invention in its preferred practical forms but the structure shown is capable of modification within a range of equivalents without departing from the invention which is to be understood broadly novel as is commensurate with the appended claims.

The embodiments of the invention in which an exclusive property or privilege is claimed are defined as follows:

1. A coupling comprising a sleeve
   a first hub and a second hub,
   said sleeve having a first end and a second end,
   first internal teeth on said first end,
   said first hub having external teeth slidably meshing with said first internal teeth,
   means on said second end of said sleeve for engaging said second hub,
   at least a pair of axially spaced notches in each of said internal teeth,
   said notches being disposed in a first circular path and a second circular path spaced axially from said first circular path,
   said external teeth on said first hub meshing with said internal teeth on said sleeve and axially slidable thereon from a first position to a second position,
   an elongated detent means in said first hub,
   spring means urging said detent means outwardly,
   said detent means having inclined sides sloping radially outwardly and toward each other at an angle to the central axis of the detent substantially equal to the angle of the edges of said notches,
   said sloping sides substantially coextensive with substantially the entire sides of said notches,
   the outer end of said detent means being received in said notches in said first circular path,
   when said sleeve is connected to said second hub,
   said sleeve being axially slidable to move said first sleeve teeth out of engagement with said first hub teeth and to move said detent means out of said first notches and into said second notches, said means of said second end of said sleeve being disengaged from said second hub when said detent means are in engagement with said second notches and a flattened portion on said detent means providing an air passage from below the detent to adjacent the sloping sides.

2. A coupling comprising a sleeve having internal teeth, a hub having external spaced teeth supported in said sleeve, said external teeth engaging said internal teeth, means on said hub to connect it to a first drive member, means on said sleeve to connect it to a second drive member, said means on one of said sleeve and hub to connect them to a drive member being disconnectable when said hub and said sleeve are slid relative to each other from first position to a second position, engaging means in the spaces between said hub teeth engaging means on said sleeve teeth for holding said teeth in said first position or in said second position, said engaging means between said hub teeth comprising spring loaded means having sides sloping outwardly and toward each other, said means on said sleeve teeth comprising first and second notches in said sleeve teeth for receiving said detent means, said detent means being elongated generally cylindrical with frustoconical ends and engaging said notches, said notches being complimentary in shape to said frustoconical ends, said sloping sides being substantially coextensive with substantially the entire sides of said notches, said first notches being spaced from said second notches and a flattened portion on said detent means providing an air passage from below the detent to adjacent the frustoconical ends.

3. The coupling recited in claim 2 wherein said detents have a cylindrical intermediate part with a first end and a second end, said first end being said frustoconical, said second end being reduced in size, said detents being received in circumferentially spaced bores in said hub, compression springs in said bores surrounding said reduced size ends.